United States Patent
Fass (10) Patent No.: US 9,864,214 B2
(45) Date of Patent: Jan. 9, 2018

(54) LOUPE ATTACHMENT APPARATUS AND SYSTEM

(71) Applicant: Edward S. Fass, Alturas, CA (US)

(72) Inventor: Edward S. Fass, Alturas, CA (US)

(*) Notice: Subject to any disclaimer, the term of this patent is extended or adjusted under 35 U.S.C. 154(b) by 0 days.

(21) Appl. No.: 15/239,016

(22) Filed: Aug. 17, 2016

(65) Prior Publication Data

US 2017/0052391 A1 Feb. 23, 2017

Related U.S. Application Data (60) Provisional application No. 62/207,096, filed on Aug. 19, 2015.

(51) Int. Cl.
| | |
|---|---|
| *G02C 7/08* | (2006.01) |
| *G02B 23/18* | (2006.01) |
| *G02B 23/02* | (2006.01) |
| *G02C 9/00* | (2006.01) |
| *G02B 7/18* | (2006.01) |
| *G02B 25/00* | (2006.01) |
| *G02B 7/08* | (2006.01) |

(52) U.S. Cl.
CPC .............. *G02C 7/088* (2013.01); *G02B 7/08* (2013.01); *G02B 7/1805* (2013.01); *G02B 23/02* (2013.01); *G02B 23/18* (2013.01); *G02B 25/004* (2013.01); *G02B 25/005* (2013.01); *G02C 9/00* (2013.01)

(58) Field of Classification Search
CPC . G02C 7/08; G02C 7/088; G02C 9/00; G02B 25/004; G02B 25/005; G02B 25/008; G02B 7/1805; G02B 23/02; G02B 23/18
USPC ................................. 359/411, 481; 351/57
See application file for complete search history.

(56) References Cited

U.S. PATENT DOCUMENTS

| | | | | |
|---|---|---|---|---|
| 2,280,354 A | * | 4/1942 | Rezos | G02B 7/002 351/63 |
| 2,796,803 A | * | 6/1957 | Stegeman | G02B 25/005 24/334 |
| 4,886,340 A | * | 12/1989 | Kanda | G02B 7/002 359/411 |
| 5,170,190 A | | 12/1992 | Berke | |
| 5,173,720 A | | 12/1992 | Lee et al. | |
| 5,923,467 A | | 7/1999 | Pericic et al. | |
| 6,120,145 A | | 9/2000 | Lyst et al. | |

(Continued)

OTHER PUBLICATIONS

Author: Hoya Technosurgical Corporation, Title: Prismvue NF2, Date: 2017, Publisher: Hoya Technosurgical Corporation, pp. 1-4, Accessed Oct. 25, 2017. http://www.hoyatechnosurgical.co.jp/en/product_details/prismvue-nf2/index.html.*

*Primary Examiner* — William R Alexander
(74) *Attorney, Agent, or Firm* — Maier & Maier, PLLC (57) ABSTRACT

According to an exemplary embodiment, a loupe attachment for glasses may be provided. The loupe attachment may include a loupe and a number of optical devices such as mirrors or prisms. The loupe and the optical devices may be connected to eyeglasses and be positioned as desired. The loupe and the optical device may be connected to the glasses on number of locations and the relative position of the loupe and optical devices in the trajectory of light may be modified. According to a second exemplary embodiment, loupes may be rigidly connected to eyeglasses and a number of optical elements may be rigidly or rotatably connected to the front end of the loupe so as to reflect the field of view situated at an angle from the loupe viewing direction.

20 Claims, 10 Drawing Sheets

(56) References Cited

U.S. PATENT DOCUMENTS

| | | |
|---|---|---|
| 6,280,031 B1 | 8/2001 | Zerkle |
| 6,356,400 B1 * | 3/2002 | Goff .................. G02B 7/002 351/158 |
| 6,764,176 B1 * | 7/2004 | Carlson .............. G02B 7/002 351/116 |
| 7,242,522 B2 | 7/2007 | Kanai |
| 7,431,453 B2 * | 10/2008 | Hogan ................ A61F 9/025 351/158 |
| 7,542,204 B2 | 6/2009 | Fante et al. |
| 7,891,808 B2 * | 2/2011 | Mazurenko .......... G02B 7/002 351/158 |
| 8,186,828 B2 | 5/2012 | Leeper |
| 9,726,908 B2 * | 8/2017 | Yang .................... G02C 7/08 |
| 2003/0142263 A1 * | 7/2003 | Caplan ................ G02B 7/002 351/57 |
| 2007/0064307 A1 * | 3/2007 | Hluchan ............. G02B 7/002 359/407 |
| 2010/0142045 A1 * | 6/2010 | Mazurenko .......... G02B 7/002 359/481 |
| 2010/0309550 A1 | 12/2010 | Hauger et al. |

\* cited by examiner

LOUPE ATTACHMENT APPARATUS AND SYSTEM

BACKGROUND

Dentists and surgeons may regularly perform procedures that may last for several hours. During such procedures, the dentist or surgeon may often have to assume an arched position to a have a direct view of the surgical field and wear surgical loupe to magnify the region of interest. It is well documented that sustaining continuous flexion of the cervical region may induce cervical strain, fatigue, and discomfort that may lead to lower performance and poorer outcome.

Current loupe designs may attempt to offer some relief by orienting the optics at an angle aimed at the surgical field. However, the partial relief from strain in the neck may be offset by increased eye fatigue caused by the surgeon having to look down continuously.

SUMMARY

According to an exemplary embodiment, a loupe attachment for glasses may be provided. This loupe attachment may allow a user of the loupe, such as a surgeon or dentist, to sit comfortably in a natural position, with their head in an ergonomically-correct forward-looking position and without requiring them to arch their back uncomfortably, while still allowing them to "see" an object at their lap/belly level and have that object be magnified as well. For example, this may allow a dentist to more comfortably look into a supine dental patient's mouth. In some embodiments, this may allow a dentist, surgeon, or other user to keep their vision on an object located directly downward by angling the user's vision approximately 90 degrees. In other embodiments, this may allow a user to see an object some distance in front of them, and may angle the user's vision downward by an amount less than 90 degrees (such as 60 degrees, or 45 degrees).

The loupe attachment may include a loupe and a number of optical devices such as mirrors and prisms. Both loupes and optical devices may be connected to eyeglasses and be positioned as desired. The loupe and the optical device may be connected to the glasses on a number of locations and the relative position of the loupe and optical devices in the trajectory of light may be modified. Loupes may also be rigidly connected to eyeglasses and a number of optical elements may be rigidly or rotatably connected to the front end of the loupe so as to reflect the field of view situated at an angle from the loupe viewing direction.

According to a first exemplary embodiment, a loupe attachment apparatus may be disclosed. Such an apparatus may include: a support element, the support element configured to be attached to a set of eyewear configured to be wearable by a user, the eyewear having a frame and further having a left lens and a right lens; and a plurality of optical elements. The optical elements may include a plurality of optical devices, a left optical device in the plurality of optical devices being disposed on the left side of the loupe attachment apparatus and a right optical device in the plurality of optical devices being disposed on the right side of the loupe attachment apparatus, each of the optical devices comprising a prism; and a plurality of loupes, a left loupe in the plurality of loupes being disposed on the left side of the loupe attachment apparatus and a right loupe in the plurality of loupes being disposed on the right side of the loupe attachment apparatus. In the apparatus, each of the left and the right optical device and the left and the right loupe may be disposed such that, when the support element is attached to the set of eyewear configured to be wearable by the user, a left beam path extends through the left loupe and the left optical device and is directed into the left lens of the eyewear, and a right beam path extends through the right loupe and the right optical device and is directed into the right lens of the eyewear; and such that non-zero angles are created between the left beam path entering the loupe attachment apparatus and the left beam path upon being directed into the left lens of the eyewear, and between the right beam path entering the loupe attachment apparatus and the right beam path upon being directed into the right lens of the eyewear.

According to a second exemplary embodiment, a loupe suspension system may be disclosed. Such an embodiment may include eyewear configured to be wearable by a user, the eyewear comprising a frame, a left lens, and a right lens, which may be standard and/or specialty eyewear. Such an embodiment may also include a support element affixed to the eyewear; and a plurality of optical elements. The optical elements may include a plurality of optical devices, a left optical device in the plurality of optical devices being disposed on the left side of the loupe attachment apparatus and a right optical device in the plurality of optical devices being disposed on the right side of the loupe attachment apparatus, each of the optical devices comprising a prism; and a plurality of loupes, a left loupe in the plurality of loupes being disposed on the left side of the loupe attachment apparatus and a right loupe in the plurality of loupes being disposed on the right side of the loupe attachment apparatus; wherein the left and the right optical device and the left and the right loupe are disposed such that a left beam path extends through the left loupe and the left optical device and is directed into the left lens of the eyewear, and a right beam path extends through the right loupe and the right optical device and is directed into the right lens of the eyewear; and wherein non-zero angles are created between the left beam path entering the loupe attachment apparatus and the left beam path upon being directed into the left lens of the eyewear, and between the right beam path entering the loupe attachment apparatus and the right beam path upon being directed into the right lens of the eyewear.

BRIEF DESCRIPTION OF THE DRAWINGS

Advantages of embodiments of the present invention will be apparent from the following detailed description of the exemplary embodiments. The following detailed description should be considered in conjunction with the accompanying figures in which.

DETAILED DESCRIPTION

Aspects of the present invention are disclosed in the following description and related figures directed to specific embodiments of the invention. Those skilled in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage, or mode of operation.

In an exemplary embodiment, illustrated in FIGS. 1A-1B and FIG. 2A-2B, the loupe attachment 101 may include a main element 108 rigidly connected to glasses 100. A number of telescopic connections 106 may connect a number of optical devices 104 to the main element 108. It may be appreciated that the optical devices 104 may include, but may not be limited to: reflective devices; mirrors; prisms made of organic or inorganic materials; mirrored prisms; prisms having any geometry, such as Bauernfeind prisms, pentaprisms, triangular prisms with 90, 60 and 30 degree angles or approximately these angle measurements (such as, for example, angle measurements within a certain number of degrees of these angle measurements, e.g. five degrees), or triangular prisms having other angle measurements, for example between 25 and 35 degrees, between 55 and 65 degrees, and between 85 and 95 degrees, as desired; or any other optical device, as it may be understood by a person having ordinary skills in the art. Combinations of optical devices may also be used, as desired. A loupe support 110 may connect a number of loupes 102 to the main element 108. One or more of the loupes 102 may be rotatably connected to the loupe support, such that the loupes 102 may be rotated with respect to the loupe support 110, if desired; alternatively, loupes 102 may be rigidly connected. In an embodiment, the assembly of one or more of the loupes 102 may be adjustable, and may be positioned to correct for focal point, adjusted for pupillary distance, and/or may be adjusted for alignment with the optical device 104; alternatively, optical device 104 may be adjusted with respect to the loupes 102. Any or all of these adjustments, or none of these adjustments, may be made to particular embodiments of an assembly of one or more of the loupes 102. For example, according to one exemplary embodiment, an assembly of a loupe 102 and an optical device 104 may be fully adjustable, such that both the loupe 102 and the 104 may each be positioned to correct for focal point, adjusted for pupillary distance, and/or adjusted for alignment. In another exemplary embodiment, an assembly of a loupe 102 and an optical device 104, such as a prism, may be partially adjustable, for example being adjustable for inter-pupillary distance, but may not otherwise be alignable. In an exemplary embodiment, two or more loupes 102 may be included in an assembly, which may provide magnified vision for both eyes. It may be appreciated that any types of loupes, such as single lens loupes, multiple lens loupes, and adjustable loupes, may be included, as desired.

In some embodiments, glasses 100 may also include magnifying lenses. For example, in some exemplary embodiments, the glasses 100 may include prescription lenses, of certain varieties (such as bifocal lenses) or of any variety, as desired or prescribed. These prescription lenses may be tailored to a specific user and may be used to replace the user's existing prescription eyewear. In some other exemplary embodiments, a loupe attachment 101 may be attachable to a user's existing eyewear rather than glasses 100 specific to the loupe attachment 101 assembly, if desired. In an exemplary embodiment, loupes 102 may be selected such that they are appropriately paired with a user's prescription eyewear, if desired. Alternatively, in some embodiments, a loupe 102 may be selected such that it accommodates the prescription of the user, as may be desired. In some embodiments, glasses 100 may not include magnifying lenses, and lenses may instead serve a protective purpose or may be absent. For example, glasses 100 may be just frames, and no lenses may be provided within the eye wires/rims of the glasses 100, if desired.

The main element 108 may be rigidly connected to the glasses by fasteners such as, but not limited to, screws, clasps, nuts, and bolts. The main element 108 may have an adjustable structure and may reposition the loupe support 110 in a horizontal and vertical direction.

In another exemplary embodiment, the first end of the telescopic connections 106 may be connected to the main element 108 through ball-socket type hinges 105 and the second end may be connected to the number of optical devices 104 through ball-socket type hinges 105. The telescopic connections 106 may allow the optical device to be placed and aligned in front or behind the loupes 102, as desired. Further, the telescopic connections 106 may have tightening screws to rigidly connect the optical elements to the main element 108. Any desired structural elements such as flexible wires, coils, bars, lockable hinges, as may be understood by a person having ordinary skill in the art, may be used to connect the main element 108 to the number of optical devices 104. Further, it may be appreciated that the telescopic connections 106 may have any desired types and number of hinges 105 and may be particularly adapted to a specific to type or brand of loupes.

Figure 1A:
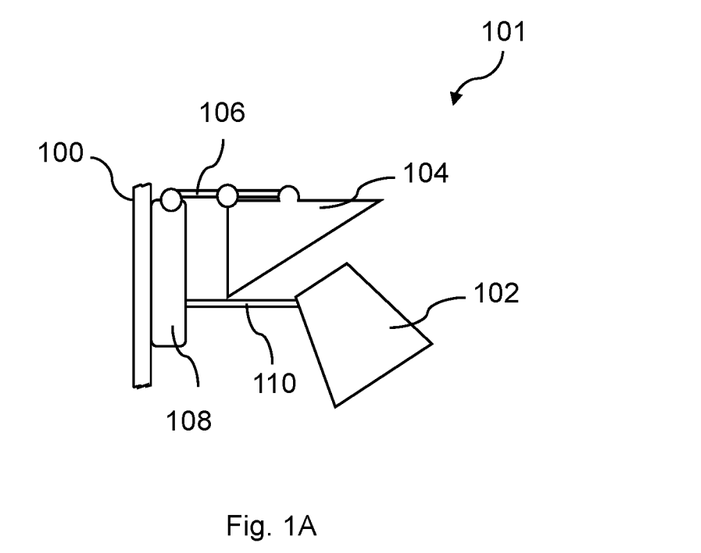
FIG. 1A is a diagram showing a side view of an exemplary embodiment of a loupe attachment with the loupe placed in front of the prism.
Figure 1B:
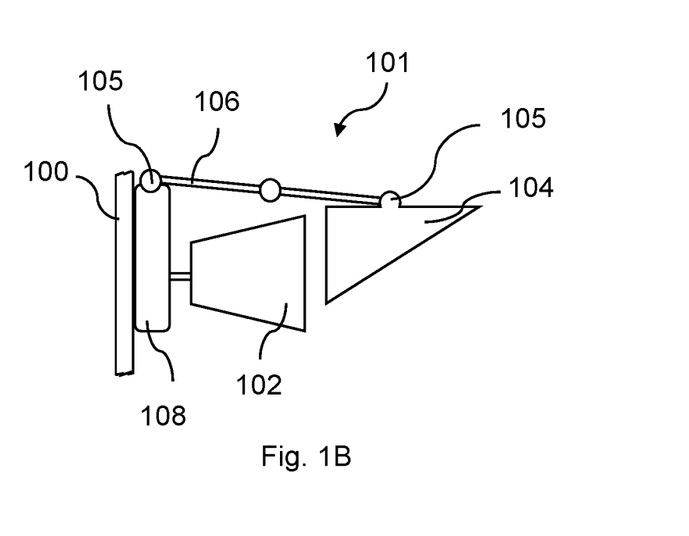
FIG. 1B is a diagram showing a side view of an exemplary embodiment of a loupe attachment with the prism placed in front of the loupe.
Figure 2A:
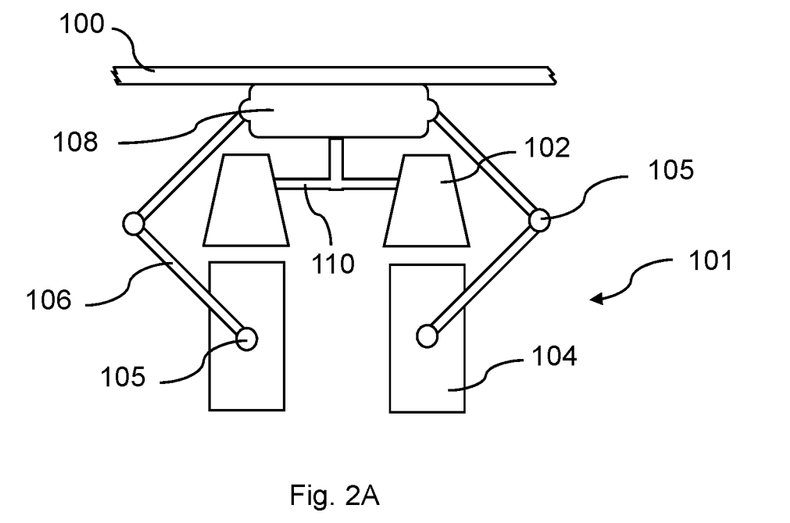
FIG. 2A is a diagram showing a top view of an exemplary embodiment of a loupe attachment with the prism placed in front of the loupe.
Figure 2B:
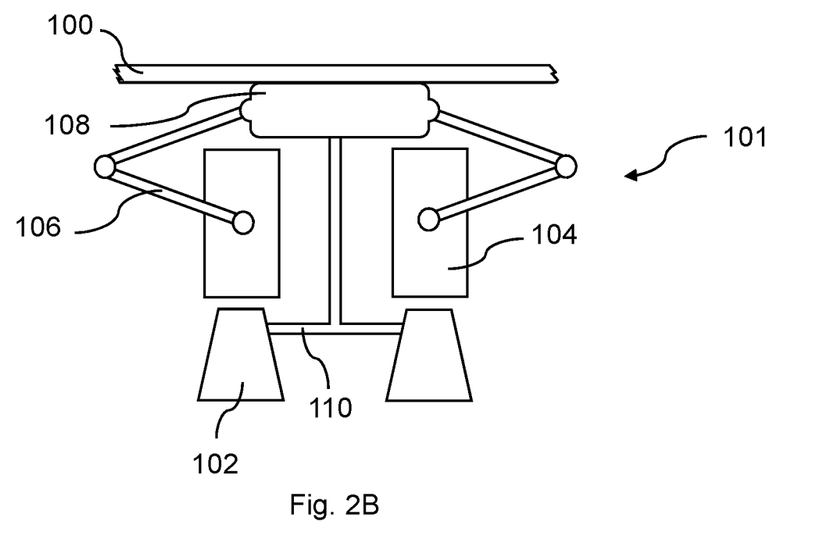
FIG. 2B is a diagram showing a top view of an exemplary embodiment of a loupe attachment with loupe placed in front of the prism.
Figure 3A:
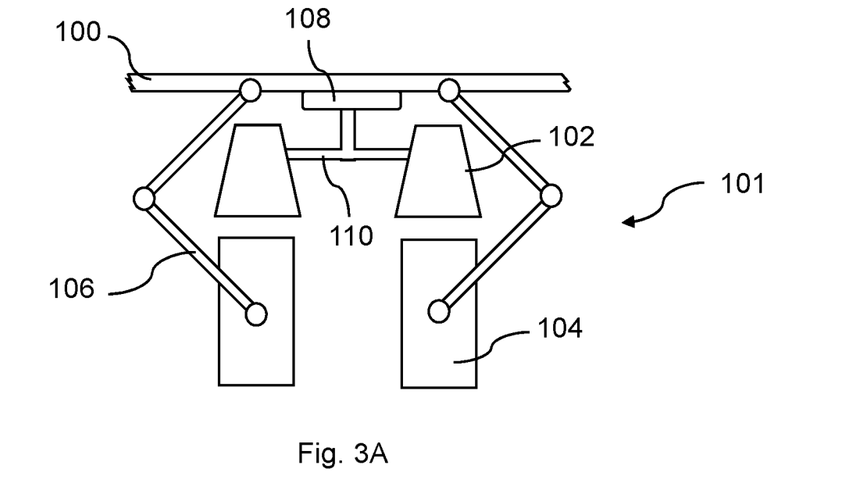
FIG. 3A is a diagram showing a top view an exemplary embodiment of a 3-pieces type of a loupe attachment.
Figure 3B:
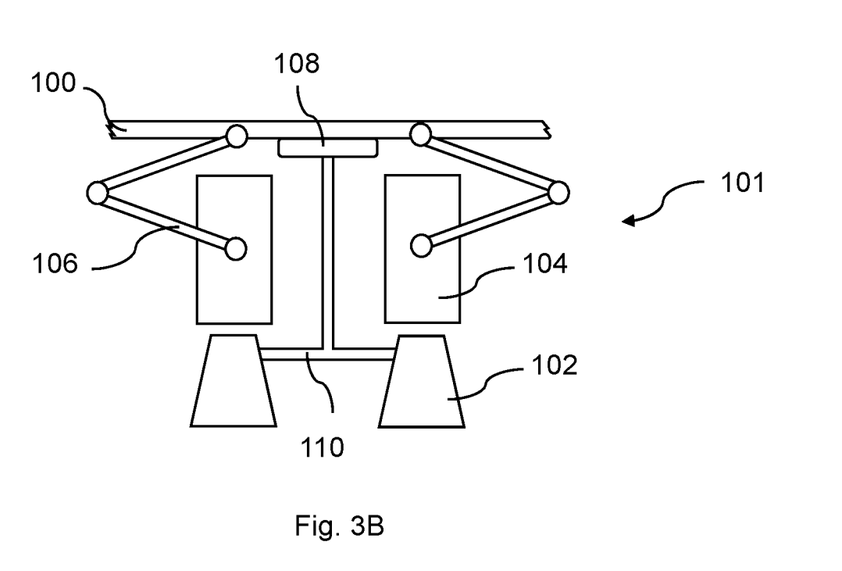
FIG. 3B is a diagram showing a top view an exemplary embodiment of a 3-pieces type of a loupe attachment.

In another embodiment illustrated in FIG. 3A-3B, the loupe attachment may include three pieces. A first piece may be main element 108 rigidly connected to glasses 100. A loupe support 110 may connect a number of loupes 102 to the main element 108 and the number of loupes 102, may be rigidly or rotatably connected to the loupe support. The main element 108 may be rigidly connected to the glasses by fasteners such as, but not limited to, screws, clasp, nuts, and bolts. The main element 108 may have an adjustable structure and may translate the loupe support 110 in a horizontal and vertical direction. The second and third pieces may be assemblies of a number of telescopic connections 106 and optical devices 104. The first end of the telescopic connection 106 may be connected to the glasses 100 through ball-socket type hinges 105 and the second end the telescopic connection 106 may be connected to the number of optical devices 104 through ball-socket type hinges 105. The telescopic connection 106 may also connect the number of optical devices 104 to the loupes 102 and to the loupe connector 110, as desired. The telescopic connections 106 may allow the optical device to be placed and aligned in front or behind the loupes 102, as desired. Further, the telescopic connections 106 may have tightening screws to rigidly connect the optical elements to the main element 108. It may be appreciated that any desired structural elements may be used to connect the main element 108 to the number of optical devices 104.

Figure 4:
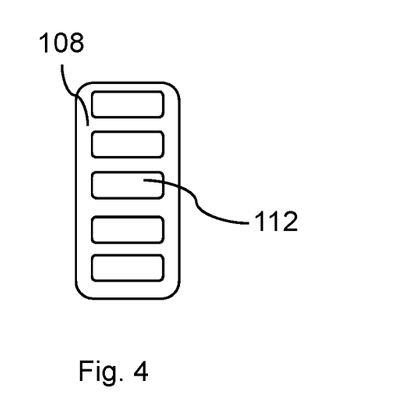
FIG. 4 is a diagram showing a front view of an exemplary embodiment of main element of a loupe attachment.

In an exemplary embodiment, a loupe frame 110 may be coupled to a main element 108 by emplacing a portion of the loupe frame 110, such as an end or an end tab of the loupe frame 110, in a slot disposed on the main element 108 and intended for the purpose of retaining the loupe frame 110. FIG. 4 may illustrate an exemplary embodiment of a vertical array of horizontally-disposed slots 112 located on the main element 108 for rigidly connecting the loupe frame 110 at one of several desired height. In another exemplary embodiment, one or more vertical slots 112, or slots 112 having another orientation, may be used instead, which may allow the loupe frame 110 to be coupled to the vertical slot or slots 112 at any desired height by sliding the loupe frame up and down the slot 112 and connecting it by an appropriate connection method, such as a clamp or pressure screw.

Figure 5A:
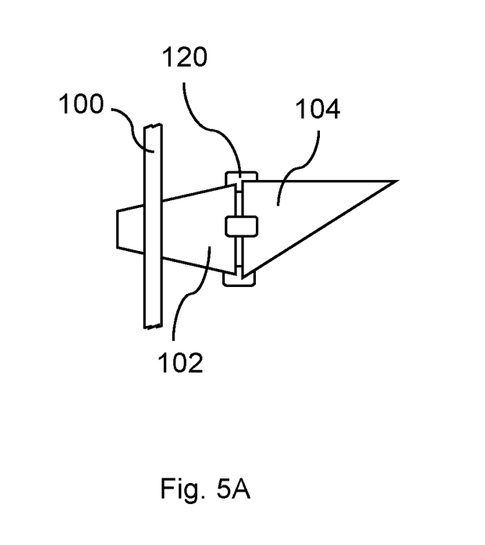
FIG. 5A is a diagram showing a side view of an exemplary embodiment of a loupe attachment.
Figure 5B:
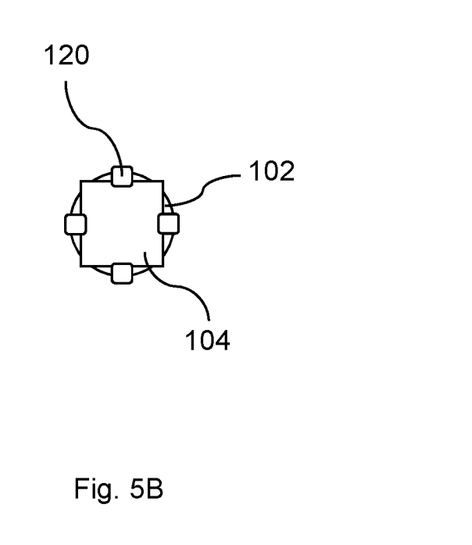
FIG. 5B is a diagram showing a front view of an exemplary embodiment of a loupe attachment.

In an exemplary embodiment illustrated in FIG. 5A-5B, a number of loupes 102 may be rigidly connected to glasses 100 in a forward position, with the axis of each loupe 102 arranged substantially perpendicular to the surface of the glasses lenses. A number of connecting elements 120 may rigidly or rotatably connect a number of optical devices 104 to the number of loupe 102. It may be appreciated that the connecting elements 120 may be any desired structural element such as, but not limited to, clasps, clamps, and anchors, as may be understood by a person having ordinary skill in the art. The number of optical devices 104 may reflect the field of view situated at an angle from the loupe viewing direction.

Figure 6A:
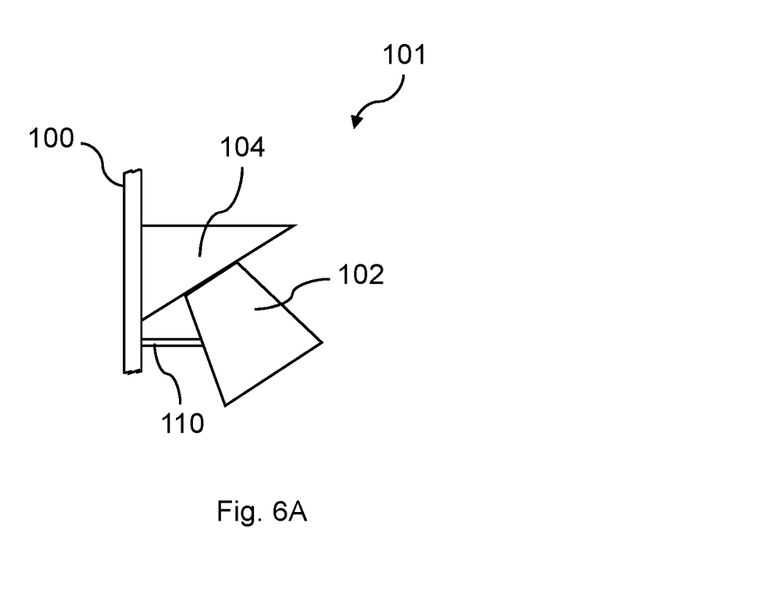
FIG. 6A is a diagram showing a side view of an exemplary embodiment of a loupe attachment with the loupe placed in front of the prism.
Figure 6B:
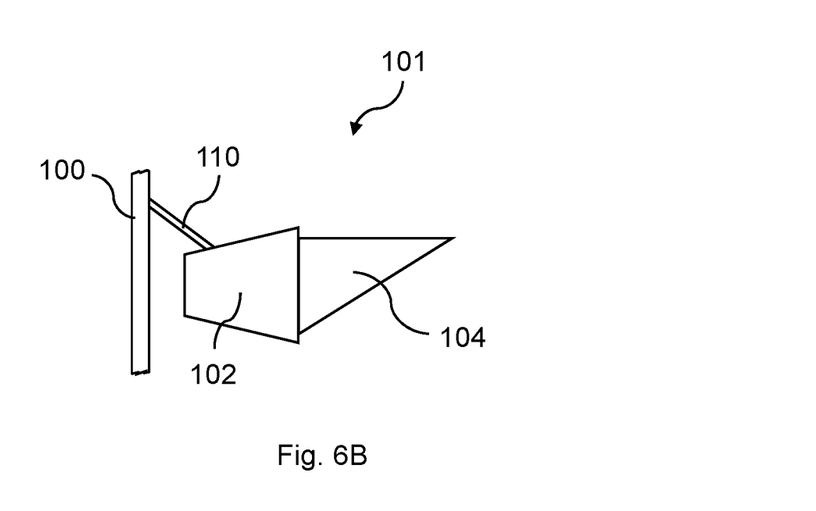
FIG. 6B is a diagram showing a side view of an exemplary embodiment of a loupe attachment with the prism placed in front of the loupe.

In another exemplary embodiment, illustrated in FIGS. 6A-6B, the loupe attachment 101 may include a number of optical devices 104. In the exemplary embodiment of FIG. 6A, the optical devices 104 may be rigidly or rotatably connected to the number of loupes 102 and placed behind the loupes 102, while in the exemplary embodiment of FIG. 6B, the optical devices 104 may be rigidly or rotably connected to the number of loupes 102 and placed in front of the loupes 102. In each exemplary embodiment, loupes 102 may be rigidly or rotatably connected to glasses 100, for example by a loupe support 110. The number of loupes 102 may be rigidly or rotatably connected to the loupe support. Each of the loupe's lenses assembly may be positioned to correct for focal point, adjusted for pupillary distance, and alignment with the optical device 104, as would be understood by a person having ordinary skill in the art. The number of loupes 102 may include a set of two lenses assembly that may provide magnified vision for both eyes. It may be appreciated that the optical device 104 may be connected to the loupes 102, the loupes support 110, and the glasses 100. Further, the connections between the glasses 100, the loupes 102, and the optical devices 104 may be adjusted and locked rigidly, or may, for example, be permanently fixed or may have another configuration, as desired.

Alternatively, in the exemplary embodiment depicted in FIG. 6A or in a similar exemplary embodiment, the one or more optical devices 104 may be attached directly to the frames of the glasses 100. In some exemplary embodiments, glasses 100 may have prescription lenses, may have other magnifying lenses, may have flat lenses or may have no lenses, as desired. According to such an exemplary embodiment, the one or more loupes 102 may be attached to the optical devices 104, to the glasses 100, or to any other component, as desired. Optical devices 104 may be fixed in place or may be adjustable, as desired.

Figure 7A:
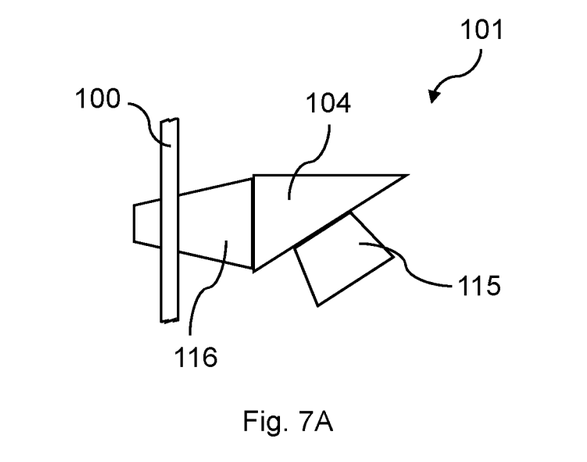
FIG. 7A is a diagram showing a side view of an exemplary embodiment of a loupe attachment with an optical device placed in between two lens assemblies.
Figure 7B:
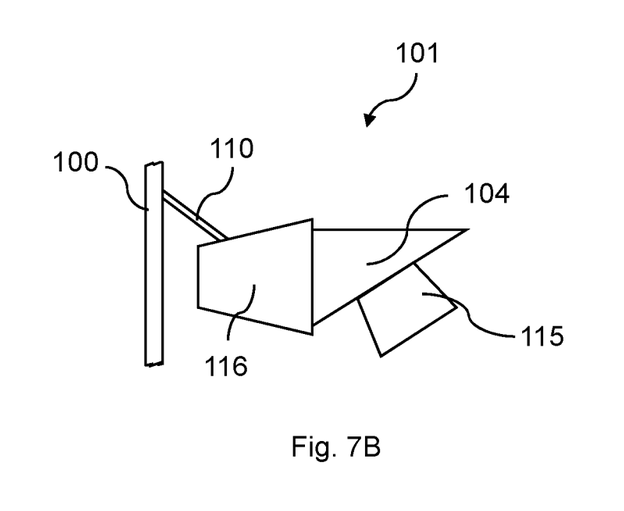
FIG. 7B is a diagram showing a side view of an exemplary embodiment of a loupe attachment with an optical device placed in between two lens assemblies.

In a further embodiment illustrated in FIG. 7A-7B, the loupe attachment 101 may include a first lens assembly 116 rigidly or rotatably connected to glasses 100. A loupe support 110 may connect a first lens assembly 116 to glasses 100. The first lens assembly 116 and the optical device 104 may be rigidly or rotatably connected to the loupe support 110. The first lenses assembly 116 and the second lens assembly 115 may be positioned to correct for focal point, adjusted for pupillary distance, and alignment with the optical device 104, as would be understood by a person having ordinary skill in the art. The loupe attachment 101 may include a second lenses assembly 115 that may be connected to the optical device 104 and may provide magnified vision for both eyes. It may be appreciated that the optical device 104 may be connected to the first lens assembly 116, the second lens assembly 115, and the loupes support 110. Further, the connections between the glasses 100, the first lens assembly 116, the second lenses assembly 115, and the optical devices 104 may be adjusted and locked rigidly, as desired.

Figure 8A:
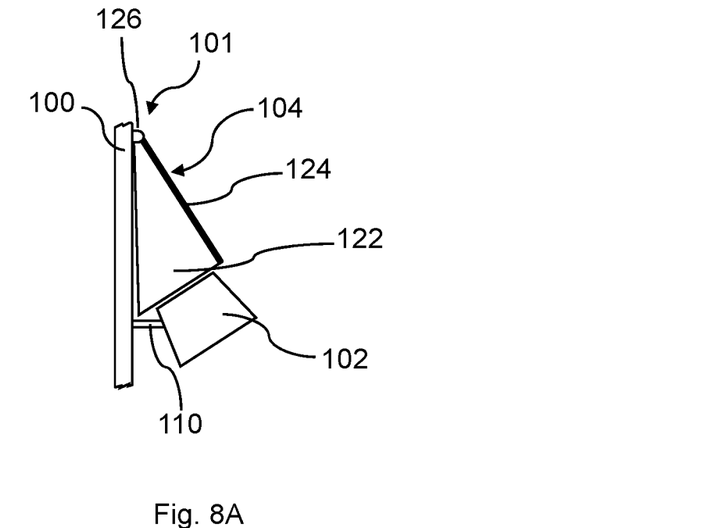
FIG. 8A is a diagram showing a side view of an exemplary embodiment of a loupe attachment having an optical device connected directly to glasses.
Figure 8B:
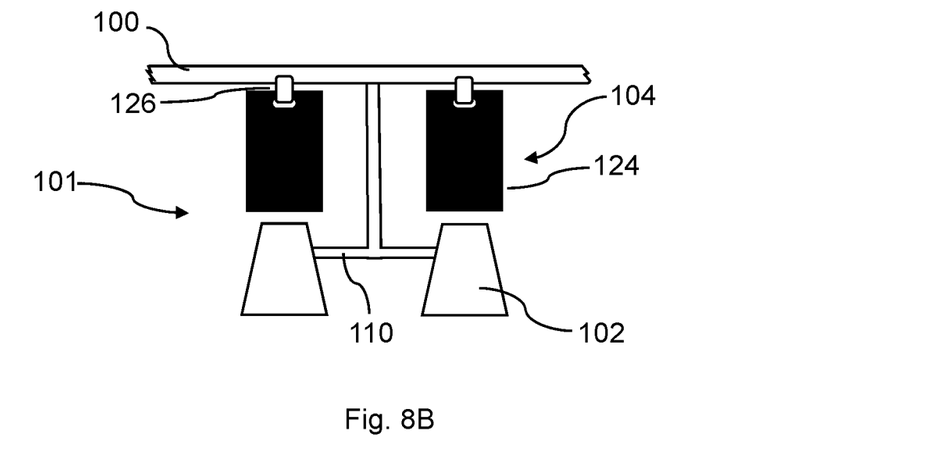
FIG. 8B is a diagram showing a top view of an exemplary embodiment of a loupe attachment having an optical device connected directly to glasses.

In a further embodiment illustrated in FIG. 8A-8B, the loupe attachment 101 may include an optical device 104 which may be connected directly to glasses 100, without the use of a main element 108. However, in some other embodiments, a main element 108 may be provided, for example to provide additional structural support.

According to some exemplary embodiments, optical devices 104 may be or may include, for example, reflective devices such as mirrors, prisms, or mirrored prisms, which may be constructed from any appropriate material and which may have any geometry. For example, according to an exemplary embodiment, such an optical device 104 may include a prism 122 and a mirror 124 affixed to at least one surface of the prism 122 and having a reflective surface oriented in the direction of the prism 122. According to another exemplary embodiment, an optical device 104 may be another configuration of one or more mirrors and/or one or more prisms, such as one or more pentaprisms, as desired. The optical device 104 may be connected to the glasses 100 by the use of a connector 126, which may allow the optical device to be adjusted in one or more directions or rotated along at least one arc, as may be desired. In some embodiments, such as in embodiments wherein the optical device 104 or the prism 122 of the optical device 104 is triangular, the connector 126 may extend through a portion of the optical device 104, such as through a corner of a triangular prism 122. In other embodiments, a connector 126 may be otherwise affixed to an optical device 104; for example, a connector 126 may be affixed to an optical device 104 by adhesive or by a mechanical connector, or by another coupling method, as may be desired.

In some embodiments, the connectors 126 may be at least one of a clamp, a slide, and a swivel, or any other device allowing adjustment. Connectors 126 may also be lockable in place or unlockable using some mechanism; for example, in an exemplary embodiment, each connector 126 may be fixed in place by the adjustment of a screw. It may be appreciated, however, that fixing, fastening, adjusting, and coupling elements, such as a screw, are merely exemplary and any other fixing, fastening, adjusting or coupling elements may be utilized, as desired. This may allow the optical devices 104 to be adjusted in a linear direction (such as in-out, up-down, or left-right) using a slide, rotated in an angular direction using a swivel (which may be, for example, a ball-and-socket allowing for multiple degrees of freedom in rotation, if desired), and then fixed in place by tightening the screw to lock the connector 126.

In an exemplary embodiment, a loupe support 110 may connect one or more loupes 102 to glasses 100. As in other embodiments, loupes 102 may be rotatably connected to the loupe support 110, if desired. In some embodiments, the interface or connection between the loupe support 110 and the glasses 100 may be adjustable; for example, in an exemplary embodiment, the glasses 100 may have a plurality of potential mounting sites in which the loupe support 110 may be emplaced, and a user may be able to move the loupe support 110 between each of the plurality of mounting sites in order to adjust the position of the loupe support. In another exemplary embodiment, the loupe support 110 may be adjustable, and may, for example, include an adjustable structure. For example, in some potential embodiments, the loupe support 110 may incorporate a slider that allows for repositioning of the loupes 102 in a horizontal direction, such as from side to side or back and forth along the loupe support 110, or may incorporate a telescoping portion that allows for repositioning of the loupes 102. In some embodiments, loupe supports 110 may have different adjustable and unadjustable states; for example, a loupe support 110 may become adjustable when a screw is loosened and unadjustable when the screw is tightened, ensuring that the loupe support 110 can be adjusted into place when desired and reducing the possibility of inadvertent adjustments being made to the loupe support 110. Different loupe supports 110 in different sizes and shapes may also be available, and adjustment of the loupe support 110 may include replacement of the loupe support 110 with a different loupe support 110, as may be desired.

Figure 9A:
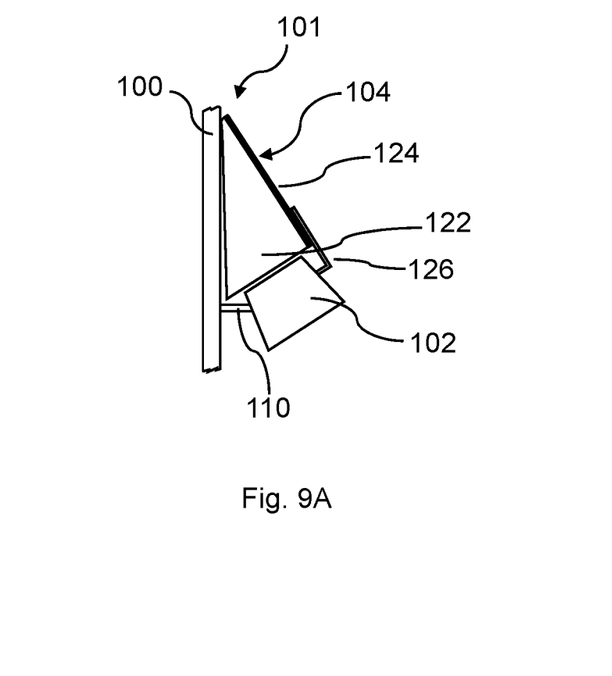
FIG. 9A is a diagram showing a side view of an exemplary embodiment of a loupe attachment having an optical device connected to a loupe.
Figure 9B:
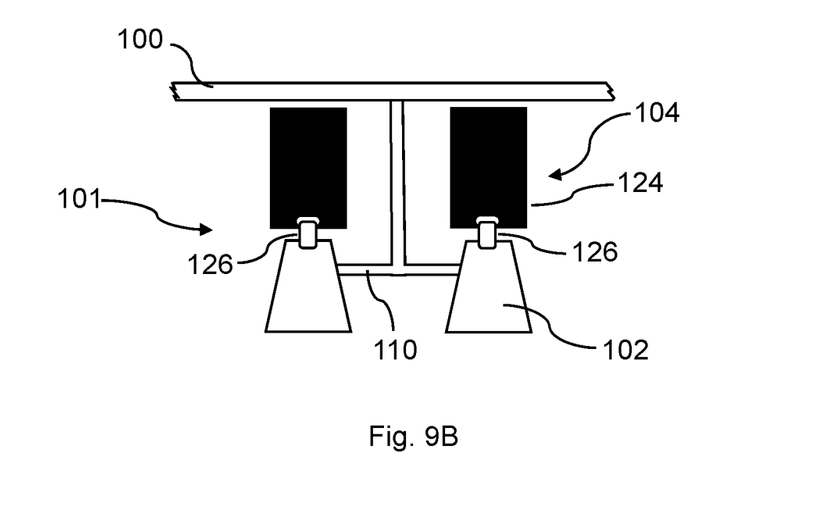
FIG. 9B is a diagram showing a top view of an exemplary embodiment of a loupe attachment having an optical device connected to a loupe.

In a further embodiment illustrated in FIG. 9A-9B, connectors 126 may be located on or connected to another part of the loupe attachment 101 rather than on the glasses 100. For example, according to an exemplary embodiment, an optical device 104 may be connected to a loupe 102, or alternatively to a loupe support 110 or another part of the loupe attachment 101, rather than being connected to the glasses 100. In some exemplary embodiments, different types of connectors 126, which may be, for example, clamps, slides, swivels, or any other devices allowing adjustment, may be used based on their placement on the loupe attachment 101 or on the glasses 100, or based on the configuration of optical devices 104 connected to or supported by the connectors 126. Connectors 126 may similarly be adjustable, regardless of their placement on the loupe attachment 101, and may allow for the optical device 104 to be adjusted in one or more directions or in one or more degrees of freedom, as desired; for example, in an exemplary embodiment, a connector 126 placed between an optical device 104 and a loupe 102 may incorporate a clamp, slide, and/or swivel, and may be fixed in place by the tightening or loosening of a screw, as desired.

Figure 10A:
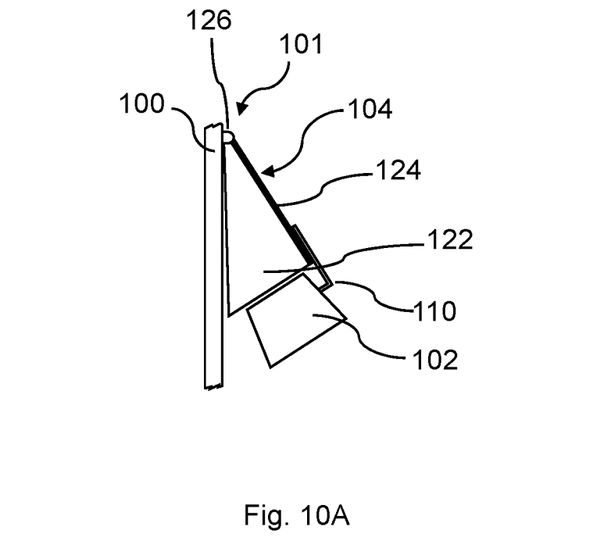
FIG. 10A is a diagram showing a side view of an exemplary embodiment of a loupe attachment having an optical device connected directly to glasses and having a loupe connected to the optical device.
Figure 10B:
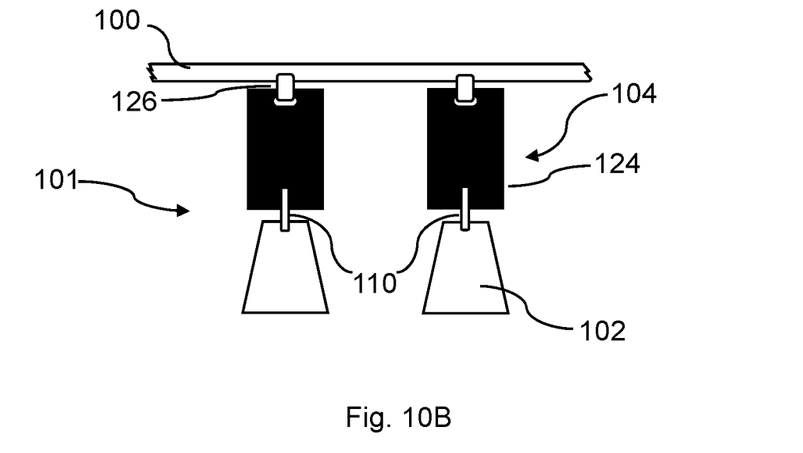
FIG. 10B is a diagram showing a top view of an exemplary embodiment of a loupe attachment having an optical device connected directly to glasses and having a loupe connected to the optical device.

In a further exemplary embodiment, illustrated in FIG. 10A-10B, other parts of the loupe attachment 101, such as the loupes 102, may be connected to and may extend from the optical devices 104. For example, according to an exemplary embodiment, the optical devices 104 may be connected to the glasses 100 via the use of connectors 126, and the loupes 102 may extend from the optical devices 104 via one or more loupe supports 110. Loupe supports 110 may be adjustable and may be linked to one or more other loupe supports 110. For example, in an exemplary embodiment, loupe supports 110 may be connected to one another, for example by a bar or cross-linkage, allowing a relationship (for example, a set distance) between the loupe supports 110 to be maintained, or allowing multiple loupe supports to be adjusted at once.

Figure 11A:
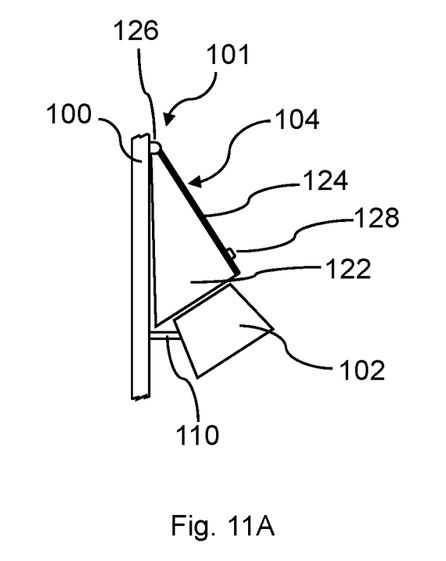
FIG. 11A is a diagram showing a side view of an exemplary embodiment of a loupe attachment having an optical device connected by a bar to another optical device.
Figure 11B:
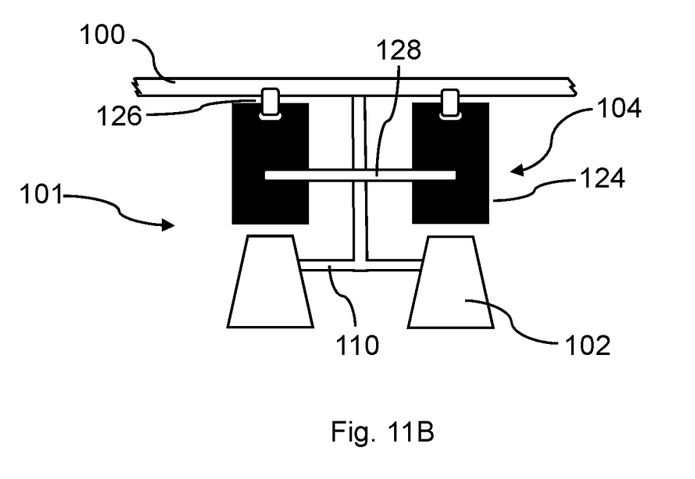
FIG. 11B is a diagram showing a top view of an exemplary embodiment of a loupe attachment having an optical device connected by a bar to another optical device.

In a further exemplary embodiment, illustrated in FIG. 11A-11B, one or more of the optical devices 104 may be linked to other optical devices 104, such as by an adjustable or fixed bar 128. This may allow for multiple optical devices 104 to be adjusted at one time, ensuring that an operator needs to perform fewer adjustment steps in order to adjust the optical devices 104 into a desired position. In an exemplary embodiment, an adjustable or fixed bar 128 may allow for a relationship between multiple optical devices 104 to be maintained when the optical devices 104 are adjusted into a different orientation. For example, in an exemplary embodiment, the optical devices 104 may be configured such that they may be flipped up and out of the way of the glasses 100 of the user such that the user can better see something that is directly in front of the glasses 100, and then flipped down into the same position (or substantially the same position) that they were in before the user flipped them up.

According to an exemplary embodiment where there is an adjustable or fixed bar 128 between one or more components, such as the optical devices 104, the connectors 126 (which again may be, for example, clamps, slides, swivels, or similar devices) may be adjustable in at least one direction or may have at least one degree of freedom, and may be constructed in such a manner as to take into account the adjustable or fixed bar 128. For example, according to an exemplary embodiment, two connectors 126 may be configured such that when one connector 126 is adjusted in a linear direction by adjusting a slide that is part of the connector 126, the other connector 126 is simultaneously adjusted with it so as to maintain the spaced relationship between the optical devices 104 or other components that is created by the bar 128. For example, according to an exemplary embodiment, only one connector 126 may be lockable, for example with a locking screw, and the other connector 126 may be freely adjustable, such that when the locking screw is released from the one connector 126, both may be adjusted. Alternatively, different numbers or configurations of connectors 126 may be understood; for example, in an exemplary embodiment, only one connector 126, such as a centrally-placed connector 126 connected to the fixed or adjustable bar 128, may be used, if desired.

In some embodiments, the entire frame of the loupe attachment 101, or a portion of the frame also including the loupes 102, may also be attached to or linked to the adjustable or fixed bar 128 or to optical devices 104 having a fixed bar 128. This may allow the entire frame of the loupe attachment 101, or at least the interconnected portion of the frame including the loupes 102, to be similarly held in a particular orientation when adjusted away from the front portion of the glasses 100. This may allow a user to adjust the loupe attachment 101 out of the way, view an object in front of the user, and easily readjust the loupe attachment 101 back into place without having to readjust each component of the loupe attachment 101.

In some embodiments, an adjustable bar 128 may be or may include at least one of a clamp, a slide, and a swivel, or any other device allowing adjustment. For example, in an exemplary embodiment, an adjustable bar 128 may include a telescoping slide. Adjustable bar 128 may also be lockable in place or unlockable using some mechanism; for example, in an exemplary embodiment, an adjustable bar 128 may be fixed in place by the adjustment of a screw. This may allow components connected to the adjustable bar 128, such as optical devices 104, to be adjusted in a linear direction using a slide, adjusted in any other desired manner, and then fixed in place by tightening the screw to lock the adjustable bar 128. Adjustable bar 128 may also be, for example, a fixed bar 128 or a substantially fixed bar 128 that may be coupled to a connector 126, which may be adjustable as previously described.

According to some exemplary embodiments, a loupe attachment 101 may be attached or attachable to other face wear other than glasses 100. For example, in an exemplary embodiment, a loupe attachment 101 may be built into or attachable to safety glasses, which may include, for example, a top shield, one or more side shields, and a bottom shield. This may allow the loupe attachment 101 to be used in roles in which the user would have to meet certain occupational safety requirements, such as, for example, certain laboratory work.

According to some other exemplary embodiments, a loupe attachment 101, or a component thereof, may be attached or attachable to other headwear other than glasses 100 or face wear. For example, in an exemplary embodiment, one or more optical devices 104 may be attached to a hat, visor, headband, or another item of headwear, and may be suspended in front of or otherwise put in combination with the remainder of the loupe attachment 101, for example by one of the connection mechanisms (such as a telescoping bar) previously discussed with regard to the glasses 100 or other face wear.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A loupe attachment apparatus, comprising:
a support element, the support element configured to be attached to a set of eyewear configured to be wearable by a user, the eyewear having a frame and further having a left lens and a right lens; and
a plurality of optical elements, the optical elements comprising:
a plurality of optical devices, a left optical device in the plurality of optical devices being disposed on the left side of the loupe attachment apparatus and a right optical device in the plurality of optical devices being disposed on the right side of the loupe attachment apparatus, each of the optical devices comprising a prism; and
a plurality of loupes, a left loupe in the plurality of loupes being disposed on the left side of the loupe attachment apparatus and a right loupe in the plurality of loupes being disposed on the right side of the loupe attachment apparatus;
wherein the left and the right optical device and the left and the right loupe are disposed such that, when the support element is attached to the set of eyewear configured to be wearable by the user, a left beam path extends through the left loupe and the left optical device and is directed into the left lens of the eyewear, and a right beam path extends through the right loupe and the right optical device and is directed into the right lens of the eyewear; and
wherein non-zero angles are created between the left beam path entering the loupe attachment apparatus and the left beam path upon being directed into the left lens of the eyewear, and between the right beam path entering the loupe attachment apparatus and the right beam path upon being directed into the right lens of the eyewear.

2. The loupe attachment apparatus of claim 1, wherein each of the optical devices comprises a triangular prism formed in the approximate shape of a 30-60-90 triangle and having angle measurements for each angle of: between 25 and 35 degrees, between 55 and 65 degrees, and between 85 and 95 degrees.

3. The loupe attachment apparatus of claim 1, wherein the support element comprises a plurality of connectors, each of the plurality of connectors being separately attachable to the frame of the eyewear, each of the connectors further being linked to at least one optical element.

4. The loupe attachment apparatus of claim 3, wherein each of the plurality of connectors is adjustable in at least one degree of freedom.

5. The loupe attachment apparatus of claim 4, wherein each of the connectors comprises at least one of a clamp, a slide, or a swivel, and wherein each of the connectors further comprises a pressure screw configured to lock or unlock movement of the connector.

6. The loupe attachment apparatus of claim 1, wherein the support element comprises a main element configured to be rigidly attached to the frame of the eyewear.

7. The loupe attachment apparatus of claim 6, wherein the support element further comprises a plurality of telescopic connections extending from the main element, and wherein each of the plurality of telescopic connections is connected to at least one optical element.

8. The loupe attachment of claim 6, wherein the support element further comprises a tab adapted to be inserted into a slot in a plurality of slots located on the main element.

9. The loupe attachment apparatus of claim 1, wherein at least one of the left lens and the right lens of the eyewear is a corrective lens; and wherein an optical device and a loupe are selected such that an image projected by the combination of the optical device and the loupe into one side of the corrective lens produces an in-focus real image on the other side of the corrective lens.

10. The loupe attachment apparatus of claim 1, further comprising a connecting bar disposed between two or more of the optical devices and maintaining a fixed distance between the two or more optical devices.

11. The loupe attachment apparatus of claim 10, wherein the connecting bar is adjustable in length.

12. The loupe attachment apparatus of claim 10, wherein the support element further comprises at least one rotary joint, the rotary joint being located between the two or more linked optical devices and a point at which the support element is configured to be attached to a set of eyewear configured to be wearable by a user;

wherein each of the two or more connected optical devices is operationally linked to the rotary joint such that rotation of the rotary joint causes the two or more connected optical devices to shift in position; and wherein the rotary joint has sufficient range of motion to allow the two or more connected optical devices to be shifted in position from a first position, wherein the two or more connected optical devices are directly in front of the left lens and right lens of the eyewear to a second position, wherein the two or more connected optical devices are not directly in front of the left and right lens of the eyewear, and wherein the left lens and the right lens of the eyewear are not obstructed.

13. The loupe attachment apparatus of claim 1, wherein each of the plurality of loupes is at least one of a single-lens loupe, a multiple-lens loupe, and an adjustable loupe.

14. The loupe attachment apparatus of claim 1, wherein one or more of the loupes in the plurality of loupes is adjustable, such that at least one of the following adjustments to the loupe may be made: positioning of the loupe to correct for focal point, adjustment of pupillary distance, and alignment of the loupe with the optical device.

15. The loupe attachment apparatus of claim 1, wherein the non-zero angles created between the left beam path entering the loupe attachment apparatus and the left beam path upon being directed into the left lens of the eyewear, and between the right beam path entering the loupe attachment apparatus and the right beam path upon being directed into the right lens of the eyewear, are each at least 45 degrees.

16. A loupe suspension system, comprising:
eyewear configured to be wearable by a user, the eyewear comprising a frame, a left lens, and a right lens;
a support element affixed to the eyewear; and
a plurality of optical elements, the optical elements comprising:
a plurality of optical devices, a left optical device in the plurality of optical devices being disposed on the left side of the loupe attachment apparatus and a right optical device in the plurality of optical devices being disposed on the right side of the loupe attachment apparatus, each of the optical devices comprising a prism; and
a plurality of loupes, a left loupe in the plurality of loupes being disposed on the left side of the loupe attachment apparatus and a right loupe in the plurality of loupes being disposed on the right side of the loupe attachment apparatus;
wherein the left and the right optical device and the left and the right loupe are disposed such that a left beam path extends through the left loupe and the left optical device and is directed into the left lens of the eyewear, and a right beam path extends through the right loupe and the right optical device and is directed into the right lens of the eyewear; and
wherein non-zero angles are created between the left beam path entering the loupe attachment apparatus and the left beam path upon being directed into the left lens of the eyewear, and between the right beam path entering the loupe attachment apparatus and the right beam path upon being directed into the right lens of the eyewear.

17. The loupe suspension system of claim 16, wherein the support element is affixed to the eyewear.

18. The loupe attachment apparatus of claim 17, wherein the support element comprises a plurality of connectors, each of the plurality of connectors being separately attached to the frame of the eyewear, each of the connectors further being linked to at least one optical element.

19. The loupe suspension system of claim 16, wherein the eyewear has at least one of a top shield, a side shield, and a bottom shield.

20. The loupe suspension system of claim 16, wherein each of the optical devices comprises a triangular prism formed in the approximate shape of a 30-60-90 triangle and having angle measurements for each angle of: between 25 and 35 degrees, between 55 and 65 degrees, and between 85 and 95 degrees.

* * * * *